Patented Apr. 7, 1936

2,036,375

UNITED STATES PATENT OFFICE 2,036,375

PRODUCTION OF CHLORINE DIOXIDE

George Paul Vincent, Niagara Falls, N. Y., assignor to The Mathieson Alkali Works, Inc., New York, N. Y., a corporation of Virginia No Drawing. Application August 15, 1934, Serial No. 739,941

3 Claims. (Cl. 23—152)

This invention relates to improvements in the production of chlorine dioxide. More particularly, the invention relates to a method for selectively separating chlorine from a gas mixture including chlorine and chlorine dioxide, such as gas mixtures produced by reaction between chlorates and acids.

Reaction between chlorine and reagents of the class consisting of the oxides, hydroxides and various carbonates (including acid carbonates) of magnesium, the alkali metals and the alkaline earth metals proceeds more rapidly than reaction between chlorine dioxide and these reagents. The differentials between the reaction velocities are sufficient to enable a substantially complete separation of chlorine from the mixture without substantial loss of chlorine dioxide under appropriate conditions. In carrying out this invention, the gas mixture including chlorine and chlorine dioxide is contacted with a reagent of this class in substantially dry form selectively to separate chlorine from the gas mixture.

When the separating reagent is used in substantially dry form, in accordance with this invention, control of the proportion of water present includes control of the degree of hydration of the separating reagent and control of the relative humidity of the gas mixture, the optimum period of contact, particularly when the chlorine and chlorine dioxide are diluted with an inert gas, is prolonged and control of the period of contact is less critical. It is thus particularly advantageous to use the separating reagent in substantially dry form.

Using magnesium compounds as separating reagents, particularly, control of the period of contact is very critical unless the magnesium compounds are used in substantially dry form. In the total absence of water, magnesium oxide reacts with neither chlorine nor chlorine dioxide, but as the proportion of water present increases the differential between the velocity of the chlorine reaction and the velocity of the chlorine dioxide reaction at first increases and then begins to diminish. When using magnesium oxide or magnesium hydroxide as a separating reagent, the ratio $H_2O:MgO$ is with advantage maintained at a value approximately 1:1–1:1.5.

The gas mixture including chlorine and chlorine dioxide also includes, with advantage, an inert gaseous diluent such as air. Improved control of the period of contact is thus attained. In so carrying out the invention, the proportion of chlorine dioxide in the total gas mixture is advantageously limited to approximately 10%–12% (by weight) for example.

A substantial excess of the separating reagent is with advantage maintained present in the zone of contact. That is, an amount of the separating reagent substantially exceeding that required for reaction with the chlorine of the gas mixture subjected to contact with the reagent is with advantage maintained present in the zone of contact, particularly when the separating agent is used in a substantially dry form. For example, the separating reagent may be used in amounts such that the chlorinated proportion of the separating reagent does not exceed about 30%–35% of the total present in the zone of contact.

The following examples of operations embodying the invention will further illustrate the invention:

*Example 1.*—A horizontal glass tube 55 cm. long and of 18 mm. internal diameter was charged with 18 grams of calcium hydroxide, $Ca(OH)_2$, this charge occupying about 40% of the internal volume of the tube. As gas mixture consisting of approximately equal proportions of chlorine and chlorine dioxide diluted with air to an extent such that the partial pressure of the chlorine dioxide approximated 25–40 mm. of mercury (at standard conditions) and substantially saturated with water vapor was passed through the charged tube at a rate of 1000 cc. per minute while maintaining a temperature of 20°–25° C., while rotating the tube at about 4–4.5 revolutions per minute and while mechanically tapping the tube to minimize sticking of the charge to the internal surface. The gas mixture was passed through the tube until the calcium hydroxide was approximately 20% chlorinated. Substantially 100% of the chlorine entering the tube was absorbed and upwards of 95% of the chlorine dioxide entering the tube was delivered from the discharge end of the tube substantially free from chlorine.

*Example 2.*—A glass tube slightly inclined from the horizontal 71 cc. long and of 56 mm. internal diameter was charged with 300–350 grams of a hydrated magnesium oxide the $H_2O:MgO$ ratio of which was 1:1.255. A gas mixture consisting of approximately equal proportions of chlorine and chlorine dioxide diluted with air to an extent such that the partial pressure of the chlorine dioxide approximated 3.6 mm. (at standard conditions) and substantially saturated with water vapor was passed through the charged tube at a rate of 5,300 cc. per minute while maintaining a temperature of 20°–25° C. and while rotating the tube at about 1 revolution per minute. Substantially 100% of the chlorine entering the tube was absorbed and upwards of 95% of the chlorine dioxide entering the tube was delivered from the discharge end of the tube substantially free from chlorine.

This invention is useful in connection with the production of chlorites as described in my applications, filed August 15, 1934, Serial Numbers 739,887, and 739,940.

I claim:

1. In the production of chlorine dioxide, the improvement which comprises selectively separating chlorine from a gas mixture including chlorine and chlorine dioxide by contacting the gas mixture with a reagent of the class consisting of the oxides, hydroxides and carbonates of magnesium, the alkali metals and the alkaline earth metals in substantially dry form.

2. In the production of chlorine dioxide, the improvement which comprises selectively separating chlorine from a gas mixture including chlorine and chlorine dioxide by contacting the gas mixture with a substantial excess of a reagent of the class consisting of the oxides, hydroxides and carbonates of magnesium, the alkali metals and the alkaline earth metals in substantially dry form.

3. In the production of chlorine dioxide, the improvement which comprises selectively separating chlorine from a gas mixture including chlorine and chlorine dioxide with an inert gaseous diluent by contacting the gas mixture with a reagent of the class consisting of the oxides, hydroxides and carbonates of magnesium, the alkali metals and the alkaline earth metals in substantially dry form.

GEORGE PAUL VINCENT.